United States Patent [19]
Sato et al.

[11] Patent Number: 4,855,631
[45] Date of Patent: Aug. 8, 1989

[54] BRUSH HOLDING DEVICE

[75] Inventors: Masaei Sato, Yabuzuka-Honmachi; Yukiteru Hosoya, Sakai, both of Japan

[73] Assignee: Mitsuba Electric Manufacturing Co., Ltd., Gunma, Japan

[21] Appl. No.: 196,046

[22] Filed: May 19, 1988

[30] Foreign Application Priority Data

May 29, 1987 [JP] Japan .............................. 62-83477[U]

[51] Int. Cl.$^4$ ............................................ H02K 13/00
[52] U.S. Cl. ...................................... 310/239; 310/88; 310/248
[58] Field of Search ............... 310/239, 240, 241, 244, 310/245, 246, 247, 248, 249, 89, 43, 88

[56] References Cited

U.S. PATENT DOCUMENTS

| | | | |
|---|---|---|---|
| 1,378,565 | 5/1921 | Schou | 310/247 |
| 2,045,293 | 6/1936 | Carlson | 310/245 |
| 2,448,850 | 9/1948 | Weber | 310/247 |
| 2,449,765 | 9/1948 | Bluemink | 310/247 |

FOREIGN PATENT DOCUMENTS

| | | | |
|---|---|---|---|
| 0196497 | 3/1958 | Austria | 310/239 |
| 0609792 | 11/1960 | Canada | 310/248 |
| 0068844 | 5/1980 | Japan | 310/247 |
| 1200420 | 7/1970 | United Kingdom | 310/239 |
| 2163298 | 2/1986 | United Kingdom | 310/239 |
| 2178248 | 2/1987 | United Kingdom | 310/239 |

*Primary Examiner*—R. Skudy
*Attorney, Agent, or Firm*—Rodman & Rodman

[57] ABSTRACT

The brush holding device includes a brush box formed into a tubular shape, having opposite open ends, and being slidably provided in a hollow portion thereof with a brush. A cap is capped onto one end portion of the brush box to block the end portion, and for receiving a reaction force of a brush spring to bring the brush into sliding contact with a commutator. A projecting portion is provided on the cap to engage a portion of the brush box, so that side walls of the brush box can be prevented from deflecting inwardly. A frame portion of the cap may be coupled onto the outer periphery of the rear end portion of the brush box.

4 Claims, 2 Drawing Sheets

BRUSH HOLDING DEVICE

BACKGROUND OF THE INVENTION

1. Field of the Invention

This invention relates to a brush holding device in a direct current (DC) machine, more particularly to a construction for preventing a brush box from being deformed, and concerned with one effective for use in a DC motor for example.

2. Related Art Statement

A known brush holding device used in a DC motor is constructed such that a brush box slidably inserted therethrough with a brush, integrally formed on a base for fixing the brush box by use of resin, a cap is capped onto one end portion of the brush box in a manner to block the brush box, and this cap receives a reaction force from a brush spring so as to bring the brush in sliding contact with a commutator.

Now, with the brush holding device of the type described, side walls of the brush box formed of resin tend to deflect inwardly due to heat, so that sliding of the brush tends to be difficult.

SUMMARY OF THE INVENTION

An object of the present invention is to provide a brush holding device wherein sliding failure of the brush can be prevented from occurring.

The brush holding device according to the present inventon features a raised portion or portions provided on a cap that covers the brush box so that the raised portion engages with a portion of the brush box.

The present invention contemplates a brush holding device wherein, when side walls of a brush box tend to deflect inwardly due to heat, a raised portion formed on a cap so as to engage a portion of the brush box supports the side walls against deflecting in, so that the brush box can be prevented from deflecting in. Accordingly, occurrence of sliding failure of the brush due to the deflecting-in of the brush box can be avoided.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which.

DESCRIPTION OF THE PREFERRED EMBODIMENTS

Figure 1:
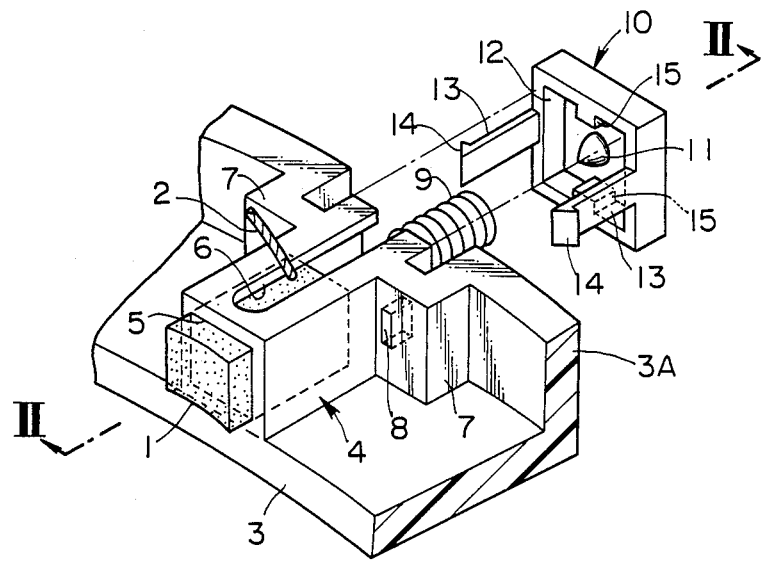
FIG. 1 is a disassembled perspective view showing the brush holding device of one embodiment of the present invention.
Figure 2:
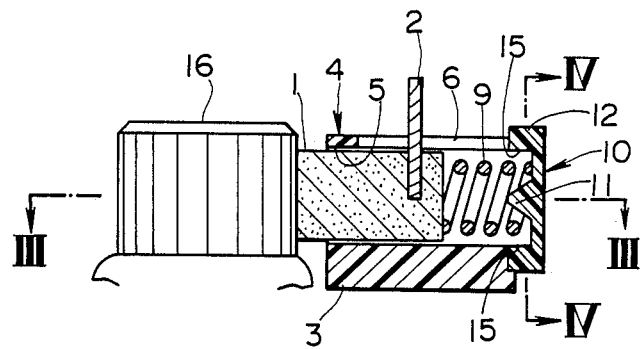
FIG. 2 is a sectional view in an assembled state taken along the line II—II in FIG. 1 thereof.
Figure 3:
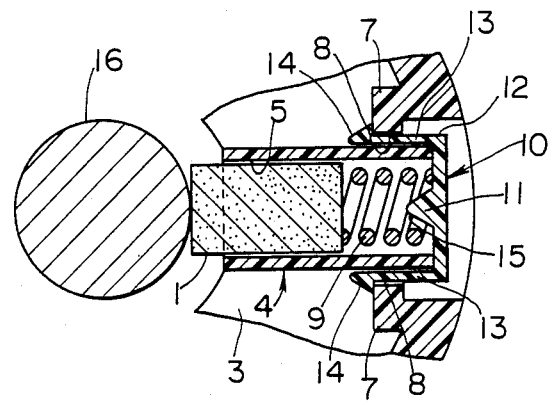
FIG. 3 is a sectional view taken along the line III—III of FIG. 2.
Figure 4:
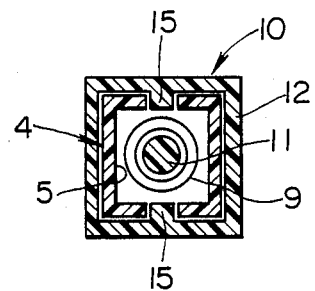
FIG. 4 is a sectional view taken along the line IV—IV of FIG. 2.

Referring to the drawings, a brush holding device in this embodiment is provided with a pair of brush boxes 4 each holding a brush 1 implanted therein with a pigtail 2. The brush box 4 is integrally formed on a base 3 for fixedly mounting this brush holding device onto a DC motor or the like, by use of resin having insulation properties. The base 3 having a generally doughnut-shaped disc construction provided on the outer periphery thereof with an annular erected wall portion 3A, is integrally provided at two positions thereof diametrically opposed to each other with the brush boxes 4. The brush box 4 is of a square tubular form having a generally regular square shape in cross-section, with opposite ends (hereinafter referred to as "forward and rear ends") thereof being open. Provided in a housing portion 5 formed by a hollow portion of the tube is a brush 1 formed into a form substantially identical with the interior of the hollow portion in such a manner that the brush 1 is linearly slidably inserted into the brush box 1, with the forward end portion thereof being able to protrude from the forward end opening of the brush box. The brush box 4 is formed at a side wall (hereinafter referred to as "a ceiling wall") opposed to the base 3 with a pigtail insertion slot 6 in a manner to extend in the longitudinal direction, being closed at the forward end and being opened at the rear end. A pigtail 2 implanted in the brush 1 is freely movably inserted through this insertion slot 6.

Each of the other pair of side walls (hereinafter referred to as "right and left walls") of the brush box 4 is outwardly raised and provided with an engageable portion 7 to be engaged with a fall-off preventive pawl, which will be described hereunder, of the cap. The engageable portion 7 is formed therein with an insertion hole 8, penetrating therethrough in the longitudinal direction of the brush box 4.

The cap 10 blocks the rear end opening in the rear end portion of the brush box 4 thus constructed, and capped so as to be able to receive a reaction force of a brush spring 9 housed in the housing portion 5. This cap 10 is formed integrally by use of resin and formed into a regular square flat plate shape generally identical with the outer shape of an end face of the brush box 4. This cap 10 is integrally provided at the generally central portion of an end face thereof directed to the brush box with a spring positioning projection 11, whereby the brush spring 9 is arranged concentrically with this projection 11, to thereby be positioned. The cap 10 is integrally provided on the outer peripheral portion thereof with a frame portion 12 so as to be coupled onto the outer periphery of the rear end portion of the brush box 4, and the brush box 4 is coupled at the rear end portion thereof with the frame portion 12, whereby the rear end opening of the brush box 4 is tightly closed by the cap 10.

The cap 10 is provided in the generally central portions of the right and left end sides thereof with a pair of fall-off preventive pieces 13, which protrude integrally from the cap 10, extending forwardly in parallel to each other. Outwardly raised from each of the forward end portions of the both fall-off preventive pieces 13 is an engageable pawl 14. When the cap 10 is capped onto the brush box 4, the fall-off preventive pieces 13 are inserted from rearward into the insertion holes 8, whereby the engageable pawls 14 of the fall-off preventive pawls 13 are engaged with the rims of openings of the insertion holes of the engageable portions 7. With this arrangement, the cap 10 is capped onto the rear end portion of the brush box 4 and is prevented from falling off. Accordingly, the cap 10, receiving the reaction force from the brush spring 9, biases the brush 1 forwardly so that the brush 1 can be brought into sliding contact with the commutator 16 under a predetermined elastic force.

The cap 10 is provided in the generally central portions of the top side edge and bottom side end edge thereof with a pair of inward deflection preventive raised portions 15, which are integrally, formed in a manner to project inwardly from the inner surface of the frame portion 12. The top projecting portion 15 is coupled into the rear end opening of the pigtail insertion slot 6 formed in the ceiling wall of the brush box 4.

Action of preventing the side walls of the brush box from deflecting inwardly in the brush holding device in this arrangement will hereunder be described.

When the brush box 4 is expanded or shrunk by the temperature cycle due to heating, etc. of the DC motor, the side wall spacing of the brush box 4 is increased or decreased because the pigtail insertion hole 6 is opened in the top wall of the brush box 4. When the side wall spacing of the brush box 4 is increased, not much trouble occurs, whereas, when the diameter of the brush box 4 is decreased, disadvantageously, sliding failure occurs with the brush 1, and trouble occurs in the performance of the brush device, because the brush 1 comes into a state of being clamped by the side walls of the brush box 4.

However, in this embodiment, the projecting portion 15 raisedly provided on the cap 10 is coupled into the rear end opening of the pigtail insertion slot 6, so that the side wall spacing of the brush box 4 can be prevented from decreasing. More specifically, even if the brush box 4 tends to contract the pigtail insertion slot 6 to decrease its side wall spacing, the pigtail insertion slot 6 cannot be contracted because the projecting portion 15 is coupled into the insertion slot 6. With this operation, in this embodiment, the side wall spacing of the brush box 4 is prevented from decreasing, whereby occurrence of sliding failure of the brush 1 due to the decreased side wall spacing is avoided, so that the brush device can maintain predetermined performance.

Furthermore, in this embodiment, the frame portion 12 of the cap 10 is coupled to the outer periphery of the rear end portion of the brush box 4, so that the side wall spacing of the brush box 4 can be prevented from increasing. More specifically, even if the side wall spacing of the brush box 4 tends to increase, the frame portion 12 clamps the brush box 4, so that the side wall spacing is prevented from increasing. Since this frame portion 12 is coupled onto the brush box 4 at the outer end thereof, an effective length of the brush spring 9 is not decreased. Consequently, the brush spring 9 can secure a sufficient effective length in association with the depth of the brush box 4.

Now, in the DC motor and the like, to make a portion between a motor yoke and an end bracket waterproof, a sealing agent is applied thereto. If this sealing agent intrudes into the interior of the brush box of the brush holding device, then sliding of the brush is impeded, so that it is necessary to prevent the intrusion. Furthermore, when a lubricating oil of the motor intrudes, unusual friction occurs disadvantageously.

In this embodiment, the frame portion 12 of the cap 10 for blocking the rear end opening of the brush box 4 is coupled to the outer periphery of the brush box 4, so that the sealing agent and the lubricating oil can be reliably prevented from intruding into the brush box 4.

Figure 5:
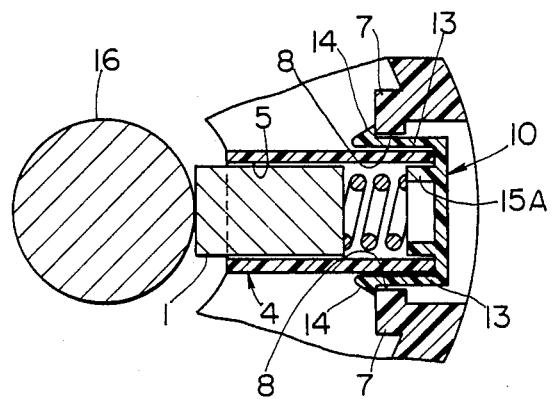
FIG. 5 is a planar sectional view showing another embodiment of the present invention.

FIG. 5 is the planar sectional view showing another embodiment of the present invention.

A difference of this embodiment from the preceding embodiment resides in that an inward deflection preventive projecting portion 15A is formed to be coupled into the inner periphery of the rear end portion of the brush box 4.

In this embodiment, the projecting portion 15A prevents the side wall spacing of the brush box 4 from decreasing, and such an advantage can be offered that the sealing agent and the lubricating oil can be prevented from intruding by this raised portion 15A.

Incidentally, needless to say, the present invention need not necessarily be limited to the above embodiments, and varius modifications are possibly made within a scope not departing from the gist thereof.

For example, it is preferable that the shape and construction of the inward deflection preventive projecting portion are suitably selected in association with the shapes and constructions of the brush box and the cap.

In order to eliminate the directional property in mounting the cap 10, there is shown an example where a pair of top and bottom inward deflection preventive projecting portions 15 are provided. However, either the top one or the bottom one may be adopted.

As has been described hereinabove, according to the present invention, since the side wall spacing of the brush box can be prevented from decreasing, occurrence of sliding failure of the brush due to the decreased side wall spacing can be avoided.

What is claimed is:

1. A brush holding device comprising, a brush box formed into an elongated hollow portion having side walls, a connecting wall connecting said side walls and opposite open ends, a brush being slidably provided in the hollow portion, a pigtail insertion slot provided in the connecting wall of said brush box, said pigtail insertion slot having an open end and a closed end, and a cap capped onto said one end portion of said brush box to block the opening at said one end portion of the brush box and to receive the reaction force of a brush spring that urges the brush into sliding contact with a commutator, and wherein said cap has a projecting portion engagable with a portion of said brush box to prevent the side walls of the brush box from deflecting toward each other.

2. A brush holding device as set forth in claim 1 wherein said projecting portion is formed to be coupled into said pigtail insertion slot to prevent the side walls of the brush box from deflecting toward each other.

3. The brush holding device as set forth in claim 1 wherein said one end portion of the brush box has a predetermined inner periphery and said projecting portion is formed into a shape having a periphery that couples with the inner periphery of said one end portion of said brush box to prevent the side walls of the brush box from deflecting toward each other.

4. The brush holding device as set forth in claim 2 wherein said one end portion of said brush box has a predetermined outer periphery and said cap has a frame portion that couples with the outer periphery of said one end portion of the brush box to prevent the intrusion of fluid into said brush box through said one end portion.

* * * * *